United States Patent
Bosch et al.

(10) Patent No.: US 7,514,839 B2
(45) Date of Patent: Apr. 7, 2009

(54) STATOR WITH A ROTARY CURRENT WINDING, BRUSHLESS DIRECT CURRENT MACHINE HAVING A STATOR, SHAPED PART FOR WINDING GUIDANCE FOR A STATOR WITH A ROTARY CURRENT WINDING, AND WINDING METHOD FOR PRODUCING A STATOR WITH A ROTARY CURRENT WINDING

(75) Inventors: Volker Bosch, Stuttgart (DE); Ulrich Peter, Wendlingen (DE)

(73) Assignee: Robert Bosch GmbH, Stuttgart (DE)

( * ) Notice: Subject to any disclaimer, the term of this patent is extended or adjusted under 35 U.S.C. 154(b) by 513 days.

(21) Appl. No.: 11/344,098

(22) Filed: Feb. 1, 2006

(65) Prior Publication Data

US 2006/0170303 A1 Aug. 3, 2006

(30) Foreign Application Priority Data

Feb. 2, 2005 (DE) .................. 10 2005 004 743

(51) Int. Cl.
*H01K 11/00* (2006.01)

(52) U.S. Cl. .................. 310/268; 310/208; 310/261; 310/266

(58) Field of Classification Search .................. 310/268, 310/208, 261, 266, 180
See application file for complete search history.

(56) References Cited

U.S. PATENT DOCUMENTS

| 4,340,829 A | * | 7/1982 | McCoy .................. 310/71 |
| 5,780,323 A | * | 7/1998 | Forouhi et al. .............. 438/131 |
| 2004/0252001 A1 | | 12/2004 | Yamada et al. |

FOREIGN PATENT DOCUMENTS

| GB | 2 310 766 A | 9/1997 |
| JP | 5-3653 | 1/1993 |
| JP | 2003-158845 | 5/2003 |

* cited by examiner

*Primary Examiner*—Gary F. Paumen
(74) *Attorney, Agent, or Firm*—Ronald E. Greigg

(57) ABSTRACT

A method of producing a stator with a rotary current winding, having a first and second face end. On the face end, at least one shaped part with struts for winding guidance is provided. A brushless direct current machine with a stator, a shaped part for winding guidance for a stator with a rotary current winding, and a winding method for producing a stator with a rotary current winding are also disclosed.

18 Claims, 2 Drawing Sheets

STATOR WITH A ROTARY CURRENT WINDING, BRUSHLESS DIRECT CURRENT MACHINE HAVING A STATOR, SHAPED PART FOR WINDING GUIDANCE FOR A STATOR WITH A ROTARY CURRENT WINDING, AND WINDING METHOD FOR PRODUCING A STATOR WITH A ROTARY CURRENT WINDING

CROSS-REFERENCE TO RELATED APPLICATIONS

This application is based on German Patent Application 10 2005 004 743.2 filed Feb. 2, 2005, upon which priority is claimed.

BACKGROUND OF THE INVENTION

1. Field Of The Invention

The invention is directed to an improved a stator with a rotary current winding, a brushless direct current machine having a stator, a shaped part for winding guidance for a stator with a rotary current winding, and a winding method for producing a stator with a rotary current winding.

2. Description of the Prior Art

In the manufacture of rotary current machines, such as motors or generators, the problem arises that the three phase coils of the stator winding must be placed individually and in succession, overlapping on the order of roof tiles, in the slots of the stator iron packet, if a uniform coil layer, high slot filling, and thus maximum efficiency are to be attained. The known method of winding one phase layer for each pole and then depositing its conductor wire uninterruptedly, creating a wire intersection with the second conductor wire and winding its phase coil, and then repeating the entire process again for the third phase coil, makes mass production uneconomical.

Plug-in windings, in which individual conductor loops are connected after insertion in slots, are also not feasible if there are relatively high numbers of conductors and/or poles, because there are too many connection points for electrical contacting means. Winding techniques that provide for the separate winding and subsequent joining together of the individual phases that are embodied as winding packets have disadvantages, because of the nonuniformity of the winding and the virtually unavoidable line intersections, that have an effect on the power, efficiency, and service life of the machine.

In the manufacture of a pull-in winding, the coils are wound either individually or jointly on a winding frame and then, with the aid of a pull-in device, pulled jointly or sequentially into the stator. The slot slits must then be closed with suitable wedges in a further operation, to prevent individual wires from escaping from the slots. Producing a pull-in winding requires relatively long production times, since the individual coils must be wound onto separate frames in a first work step. In a second work step, these prefabricated coils are transferred to the pull-in tool and then pulled into the stator in a further operation.

A further production method that is often employed comprises winding the winding directly into the stator slots with the aid of a so-called needle winder. For production reasons, however, the winding must be embodied such that the winding heads of the stator coils on the face ends do not overlap, and that there are no intersections whatever in the area of the winding head. The nonintersecting winding heads produced in this way are so-called toothed coil windings. However, they have electrically unfavorable properties, since their cross-sectional area is limited to approximately two-thirds of the maximum possible cross-sectional area. The applicable winding must therefore have more windings and hence more copper, which means increased consumption of material.

OBJECT AND SUMMARY OF THE INVENTION

In a stator according to the invention with a rotary current winding, the stator has at least one shaped part on the face end for winding guidance. Preferably, one such shaped part is providing on both face ends. This advantageously creates a possible way of winding rotary current windings with intersecting coil heads directly into a stator lamination packet, for instance with a needle winder. The especially designed slots and struts of the face-end shaped part favorably assure that the coil heads come to rest not one above the other but rather side by side. Especially favorable electrical properties of the winding arrangement are thus attained, so that there is no need for a relatively large number of windings, which in turn makes for economies of material. Because of the face-end guidance of the winding heads, it is advantageously possible for the most part to dispense with the mounting of slot-closing wedges, which simplifies and rationalizes the entire production process. Preferably, each shaped part on the face end is embodied as a plastic shaped part.

In a shaped part according to the invention, slots and struts are embodied in such a way that in the installed state, individual chambers for receiving coil heads are formed. The shaped part is preferably of plastic.

In a preferred embodiment of the invention, the thus-formed chambers and struts are offset both radially and circumferentially. Three different types of struts can be provided on the two face ends of the stator lamination packet; a first type of struts is formed of circumferentially uniformly distributed E-shaped partial elements, a second type of struts of circumferentially uniformly distributed V-shaped partial elements, and a third type of struts of circumferentially uniformly distributed rod-shaped partial elements that are located around a central axial stator bore. The E-shaped partial elements and the V-shaped partial elements may each be circumferentially spaced apart from one another, with the E-shaped partial elements disposed on a first radius, the V-shaped partial elements disposed on a second radius, and the rod-shaped partial elements are disposed on a third radius. The first radius is shorter than the second radius, and the third radius is shorter than the first radius and the second radius. Preferably, the V-shaped partial elements can protrude with their tips into interstices between the E-shaped partial elements.

Advantageously, the struts partition off individual chambers, open at the face end, in which nonintersecting coil heads of a winding arrangement are placed. The coil heads are parts of coils, and coil flanks connected to the coil heads on both sides penetrate the stator axially in stator slots. For a switch connection between an inner and an outer coil layer, conduits may be provided.

Especially preferably, at least three struts can be provided, each for one type of partial elements, so that a total of six separate chambers per face end are formed. In the thus-formed six chambers, six coil heads of what is for instance a quadrupole rotary field winding can be deposited in nonintersecting fashion by means of a needle winder. The struts can favorably simultaneously take on the function of slot insulation by lining the stator slots. The slots are preferably filled from the direction of the slot bottom with copper from the coils, which is reinforced by a suitable embodiment of the chamber shapes.

The shaped parts can be separately injection-molded and inserted into the stator lamination packet. It can also be provided that the shaped parts are injection-molded directly onto the stator lamination packet. The shaped parts are preferably made from plastic.

The E-shaped partial elements expediently separate two different coil heads from one another, and coil flanks are guided downward toward the opposite face end in the hollow space between the prongs of the E-shaped partial element. The V-shaped partial elements may be located with their tips between two different coil heads. The rod-shaped partial elements favorably assure that the individual layers of the winding arrangement will not slip off toward a centrally located stator bore; the stator bore is intended for receiving the rotor.

In an especially preferred embodiment, the shaped part has an electrical contacting means, such as a pressed screen, in particular a pressed copper screen. By placing or spray-coating the pressed screen in the shaped parts on the face ends, winding ends can preferably be contacted directly and provided for making a star point connection. The result is electrical outputs of the coil and stator that are favorably defined, making the overall device especially highly suited to automated mass production. The electrical connection can be made by welding, such as by thermal welding, friction and ultrasound welding, or by soldering, crimping, insulation displacement connection, wire wrapping, and the like.

Especially shaped slots and struts or pegs may also be provided for depositing winding ends.

A brushless direct current machine according to the invention includes a stator with a rotary current winding that corresponds in its structure to the stator described above.

In a winding method of the invention for producing a stator with a rotary current winding, coil heads of a winding arrangement are placed in nonintersecting fashion in chambers that are partitioned off by struts in at least one shaped part located on the face end of the stator. The struts may preferably have the shaping described above. The coil heads may be parts of coils that penetrate the stator axially in stator slots. It may be provided that between prongs of the E-shaped partial elements, hollow chambers are formed, in which coil flanks are passed in the axial direction downward toward the opposite face end. Advantageously, the coil is located such that it can be wound in one operation using a needle winder, which is preferably capable of moving three nozzles synchronously. Overall, a method is thus made available which is especially amenable to mass production.

Preferably, for construction reasons, the method is suitable for machines having numbers of poles that are divisible by four.

BRIEF DESCRIPTION OF THE DRAWINGS

The invention will be better understood and further objects and advantages thereof will become more apparent from the ensuing detailed description of a preferred embodiment taken in conjunction with the drawings, in which.

DESCRIPTION OF THE PREFERRED EMBODIMENT

Figure 1:
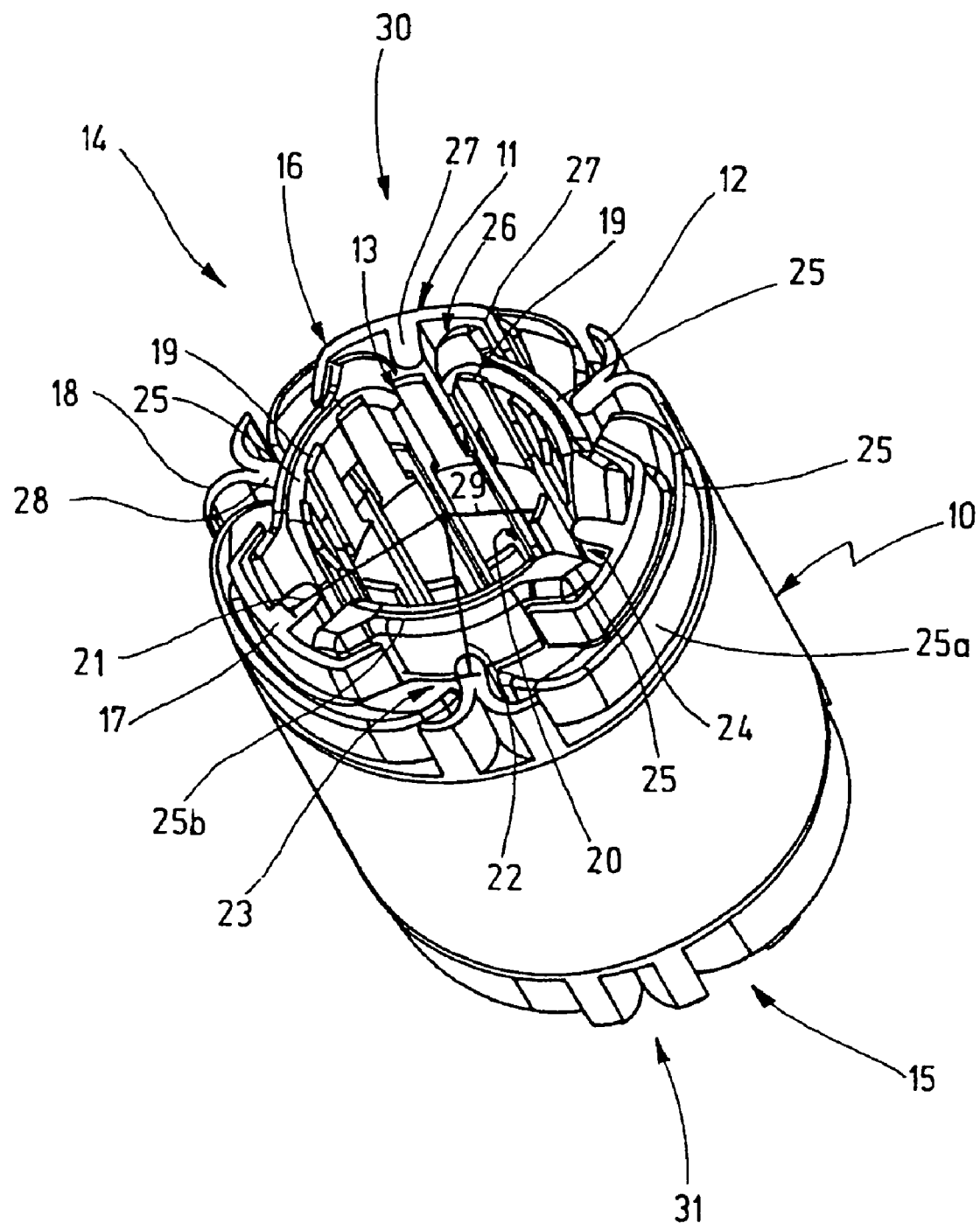
FIG. 1 is a perspective view of a stator lamination packet of a stator according to the invention with coils place in it.

Identical elements are each identified in the drawings by the same reference numerals. For the sake of simplicity, only some of the identical elements in the drawings are identified by reference numerals.

Figure 2:
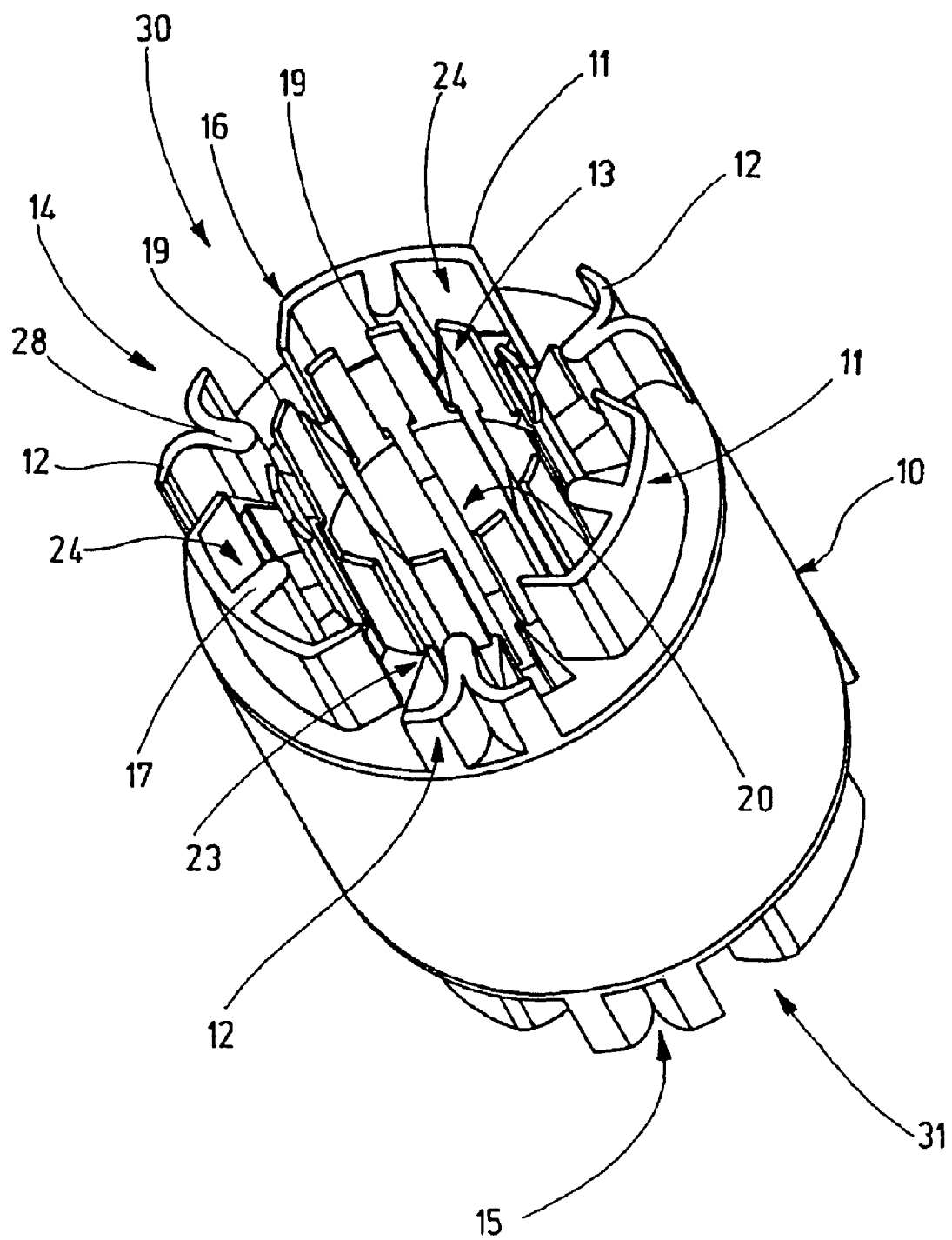
FIG. 2 is a view corresponding to FIG. 1, without coils.

FIGS. 1 and 2 each show a perspective view of a stator 10 with a first face end 14 and a diametrically opposite second face end 15; the stator 10 in FIG. 1 has a winding arrangement, and the view in FIG. 2 is shown without coils. Switch connections between individual coil layers and connection wires are not shown. On each face end, the stator 10 has a respective shaped part 30, 31 in which slots and struts 11, 12, 13 are embodied in such a way that in the installed state, individual chambers 24 for receiving coil heads are created. The shaped parts 30, 31 form a winding guide device 16. The struts 11, 12, 13 are radially and circumferentially offset on the face end. A total of three different types of struts 11, 12, 13 are embodied, with a first type of struts 11 comprising circumferentially uniformly distributed E-shaped partial elements 17 and a second type of struts 12 formed of circumferentially uniformly distributed V-shaped partial elements 18; the tip of the V and the prong of the E point toward the center of the stator 10. A third type of struts 13 is formed of circumferentially uniformly distributed rod-shaped partial elements 19, which are located around a central axial stator bore 20. The axial stator bore 20 serves to receive a rotor, not shown.

The E-shaped partial elements 17, V-shaped partial elements 18, and rod-shaped partial elements 19 are each spaced apart circumferentially from one another; the E-shaped partial elements 17 are each disposed on a first radius 21, the V-shaped partial elements 18 are disposed on a second radius 22, and the rod-shaped partial elements 19 are disposed on a third radius 29. The first radius 21 is shorter than the second radius 22, and the third radius 29 is shorter than the first radius 21 and the second radius 22. The V-shaped partial elements 18 protrude with their tips into interstices 23 between the E-shaped partial elements 17.

By means of the struts 11, 12, 13, individual chambers 24, open at the face end, are partitioned off; in them, coil heads 25 of a winding arrangement are placed in nonintersecting fashion. The coil heads 25 are parts of a substantially square-shaped coil; coil flanks, not shown, penetrate the stator 10 axially in stator slots, not shown. For a switch connection between an inner and an outer coil layer, conduits, not shown, may be provided. The coil heads 25 are embodied in hooplike form; coil heads 25a radially embracing the E-shaped partial elements 17 on the outside are embodied in concave form as viewed from the end of the hoop, and coil heads 25b that engage the prongs 27 of the E-shaped partial elements 17 are embodied in convex form as viewed from the end of the hoop.

A total of six chambers are partitioned off in FIG. 1 by the struts 11, 12, 13, and a total of six coil heads 25 of a quadrupole rotary field winding are placed in these chambers in nonintersecting fashion by means of a needle winder. The E-shaped partial elements 17 separate two different coil heads 25 from one another, and in the hollow chamber 26 between the prongs 27 of the E-shaped partial element 17, the flanks of the coil are guided toward the respective opposite face end 15. Each of the V-shaped partial elements 18 is located with its tip 28 between two different coil heads 25 and forms a chamber-like partition from the outside.

The face-end shaped parts 30, 31 thus described may have an electrical contacting means, such as a pressed screen, whereupon defined outputs for winding ends are created.

The winding method for producing a stator is preferably done by means of a needle winder; the coil heads 25 of the winding arrangement are placed in nonintersecting fashion into the chambers 24 that are partitioned off by the struts 11, 12, 13 located on the face end of the stator 10. The winding arrangement of the stator 10 can preferably be produced in one operation by means of a needle winder with three synchronously movable nozzles.

The foregoing relates to a preferred exemplary embodiment of the invention, it being understood that other variants and embodiments thereof are possible within the spirit and scope of the invention, the latter being defined by the appended claims.

We claim:

1. A stator with a rotary current winding, the stator comprising a first and second face end, and a shaped part with a plurality of struts for winding guidance on at least one of said face ends, wherein said shaped part comprises a first type of struts formed of circumferentially uniformly distributed E-shaped partial elements.

2. The stator as defined by claim 1, wherein the struts are arranged in radially and circumferentially offset fashion.

3. The stator as defined by claim 1, wherein said shaped part comprises a second type of struts formed of circumferentially uniformly distributed V-shaped partial elements.

4. The stator as defined by claim 3, wherein said shaped part comprises a third type of struts formed of circumferentially uniformly distributed rod-shaped partial elements, which are located about a central axial stator bore.

5. The stator as defined by claim 4, wherein the E-shaped partial element and the V-shaped partial elements are circumferentially spaced apart from one another, with the E-shaped partial elements disposed on a first radius, the V-shaped partial elements disposed on a second radius, and the rod-shaped partial elements are disposed on a third radius.

6. The stator as defined by claim 3, wherein the V-shaped partial elements protrude with their tips into interstices between the E-shaped partial elements.

7. The stator as defined by claim 1, wherein the E-shaped partial elements separate two different coil heads from one another, and in the hollow space between the prongs of the E-shaped partial element, coil flanks are guided each toward the respective opposed face end.

8. The stator as defined by claim 3, wherein the V-shaped partial elements are located with their tips between two different coil heads.

9. The stator as defined by claim 1, wherein the shaped part comprises an electrical contacting means.

10. A brushless direct current machine having a stator as defined by claim 1.

11. A stator with a rotary current winding, the stator comprising a first and second face end, and a shaped part with a plurality of struts for winding guidance on at least one of said face ends, wherein the struts partition off individual chambers, open at the face end, in which nonintersecting coil heads of a winding arrangement are placed.

12. The stator as defined by claim 11, wherein the coil heads are parts of coils which penetrate the stator axially in stator slots.

13. The stator as defined by claims 11, further comprising conduits for a switch connection are provided between an inner and an outer coli layer.

14. A shaped part for winding guidance for a stator with a rotary current winding, the shaped part comprising differently embodied struts, the struts being embodied such that in the installed state, individual chambers for receiving coil heads are formed, wherein a first type of struts is formed of circumferentially uniformly distributed E-shaped partial elements.

15. The stator as defined by claim 14, wherein a second type of struts is formed of circumferentially uniformly distributed V-shaped partial elements.

16. A stator as defined by claim 15, wherein a third type of struts is formed of circumferentially uniformly distributed rod-shaped partial elements, which are located about a central axial stator bore.

17. A winding method for producing a stator with a rotary current winding, the method comprising placing coil heads of a winding arrangement in nonintersecting fashion in chambers, which are partitioned off by struts located on the face end of the stator wherein said struts are formed of circumferentially uniformly distributed E-shaped partial elements.

18. A winding method as defined by claim 17, wherein the winding arrangement of a stator is produced in one operation by means of a needle winder with synchronously movable nozzles.

* * * * *